(12) United States Patent
Li et al.

(10) Patent No.: US 10,887,093 B2
(45) Date of Patent: Jan. 5, 2021

(54) ON-CHIP CONTINUOUS VARIABLE QUANTUM KEY DISTRIBUTION SYSTEM WITH POLARIZATION AND FREQUENCY DIVISION MULTIPLEXING

(71) Applicant: Nokia Technologies Oy, Espoo (FI)

(72) Inventors: Hongwei Li, Cambridge (GB); Enrique Martin-Lopez, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 404 days.

(21) Appl. No.: 15/752,346

(22) PCT Filed: Aug. 14, 2015

(86) PCT No.: PCT/US2015/045284
§ 371 (c)(1),
(2) Date: Feb. 13, 2018

(87) PCT Pub. No.: WO2017/030532
PCT Pub. Date: Feb. 23, 2017

(65) Prior Publication Data
US 2020/0204362 A1   Jun. 25, 2020

(51) Int. Cl.
*H04L 9/08* (2006.01)
*G06N 10/00* (2019.01)

(52) U.S. Cl.
CPC .......... *H04L 9/0852* (2013.01); *G06N 10/00* (2019.01); *H04L 9/08* (2013.01); *H04L 9/0855* (2013.01); *H04L 9/0858* (2013.01)

(58) Field of Classification Search
CPC ....... H04L 9/08; H04L 9/0852; H04L 9/0855; H04L 9/0858; G06N 10/00
See application file for complete search history.

(56) References Cited

U.S. PATENT DOCUMENTS

2004/0062396 A1\* 4/2004 Debuisschert ........ H04L 9/0858
380/256
2004/0109564 A1\* 6/2004 Cerf ...................... H04L 9/0858
380/256
(Continued)

FOREIGN PATENT DOCUMENTS

CN      102916807 A     2/2013
WO    2015/050623 A2   4/2015
(Continued)

OTHER PUBLICATIONS

Xuan et al., "A 24 km fiber-based discretely signaled continuous variable quantum key distribution system", Dec. 21, 2009, School of Electrical and Computer Engineering, Georgia Institute of Technology (Year: 2009).\*

(Continued)

*Primary Examiner* — Jayesh M Jhaveri
(74) *Attorney, Agent, or Firm* — Laine IP Oy

(57) ABSTRACT

In some example embodiments, there is provided an apparatus. The apparatus may include a frequency shifter configured to shift a reference signal to a portion of an optical spectrum separate from another portion of the optical spectrum being used by a signal of interest; and a polarization rotator configured to provide the reference signal shifted and rotated by the polarization rotator. The apparatus may also include a modulator configured to modulate the signal of interest with coherent state information from which quantum key information is derivable. Related systems, methods, and articles of manufacture are also disclosed.

20 Claims, 10 Drawing Sheets

(56) References Cited

U.S. PATENT DOCUMENTS

| | | | |
|---|---|---|---|
| 2004/0156502 A1* | 8/2004 | Weinfurther | H04L 9/0852 380/44 |
| 2005/0078827 A1* | 4/2005 | Tajima | H04L 9/0858 380/256 |
| 2006/0262930 A1 | 11/2006 | Dinu et al. | |
| 2006/0263096 A1 | 11/2006 | Dinu et al. | |
| 2007/0127932 A1* | 6/2007 | Qi | H04B 10/5561 398/188 |
| 2008/0267635 A1* | 10/2008 | Kawamoto | G09C 1/00 398/141 |
| 2009/0268901 A1 | 10/2009 | Lodewyck et al. | |
| 2015/0055961 A1* | 2/2015 | Meyers | H04B 10/70 398/140 |
| 2020/0266977 A1* | 8/2020 | Nordholt | H04B 10/70 |

FOREIGN PATENT DOCUMENTS

| | | |
|---|---|---|
| WO | 2015/189456 A1 | 12/2015 |
| WO | 2016/099565 A1 | 6/2016 |

OTHER PUBLICATIONS

Elser et al., "Feasibility of Free Space Quantum Key Distribution With Coherent Polarization States", New Journal of Physics, vol. 11, 2009, pp. 1-12.

Heim et al., "Atmospheric Continuous-Variable Quantum Communication", New Journal of Physics, vol. 16, 2014, pp. 1-13.

"Electro-optic Modulator", Wikipedia, Retrieved on Jan. 24, 2018, Webpage available at : https://en.wikipedia.org/?title=Electro-optic_modulator.

Ogiso et al., "[011] Waveguide Stripe Direction n-i-p-n Heterostructure InP Optical Modulator", Electronics Letters, vol. 50, No. 9, Apr. 24, 2014, pp. 688-690.

Zhao et al. ,"Low Drive Voltage Optical Phase Modulator With Novel InGaAlAs/InAlAs Multiple-Quantum-Barrier Based n-i-n Heterostructure", OSA Publishing, vol. 21, No. 21, 2013, 10 pages.

Qi et al., "Experimental Study on Gaussian-Modulated Coherent States Quantum Key Distribution Over Standard Telecom Fiber", Physical Review A , vol. 76, No. 5, Nov. 2007, pp. 1-21.

Elser et al., "Free Space Quantum Key Distribution With Coherent Polarization States", Research Paper, Jun. 14-19, 2009, 2 pages.

Qi et al., "Quantum Key Distribution Based on a Sagnac Loop Interferometer and Polarization-Insensitive Phase Modulators", IEEE International Symposium on Information Theory, Apr. 25, 2006, 4 pages.

International Search Report and Written Opinion received for corresponding Patent Cooperation Treaty Application No. PCT/US2015/045284, dated Apr. 21, 2016, 15 pages.

Quyen Dinh Xuan et al: "A 24 km fiber-based discretely signaled continuous variable quantum key distribution system", arxiv.org, Cornell University Library, 201 Olin Library Cornell University Ithaca, NY 14853, Oct. 6, 2009 (Oct. 6, 2009).

Diamanti Eleni: "Practical secure quantum 1-3,5, communications", 7-12, Optomechatronic Micro/Nano Devices and 16-19, Components III : Oct. 8-10, 2007, Lausanne, Switzerland; [Proceedings of 21,23-28 SPIE , ISSN 0277-786X], SPIE, Bellingham, Wash, vol. 9505, May 5, 2015 (May 5, 2015), pp. 95050L-95050L, XP060053161, DOI: 10.1117/12.2185062 ISBN: 978-1-62841-730-2.

"Quantum Key Distribution (QKD); 1-36 Components and Internal Interfaces", Group Specification, European Telecommunications Standards Institute (ETSI), 650, Route Des Lucioles ; F-06921 Sophia-Antipolis ; France, vol. QKD, No. V1.1.1, Dec. 1, 2010 (Dec. 1, 2010).

Office Action received for corresponding European Patent Application No. 15757071.4, dated Sep. 9, 2019, 5 pages.

\* cited by examiner

ON-CHIP CONTINUOUS VARIABLE QUANTUM KEY DISTRIBUTION SYSTEM WITH POLARIZATION AND FREQUENCY DIVISION MULTIPLEXING

RELATED APPLICATION

This application was originally filed as PCT Application No. PCT/US2015/045284 filed Aug. 14, 2015.

FIELD

The subject matter described herein relates to quantum key distribution.

BACKGROUND

Quantum key distribution refers to the use of quantum mechanics to produce and distribute an encryption key. In a quantum key distribution system, two parties can produce a shared, random secret key known only to the two parties, and the shared, random secret key can be used to encrypt and decrypt messages. In a quantum key distribution system, the two parties can detect the presence of a third party observing, or trying to detect the presence of, the key. As quantum mechanics finds that an observation of the key disturbs the key, the third party observation/eavesdropping on the key disturbs the key and thus introduces detectable anomalies.

SUMMARY

In some example embodiments, there is provided an apparatus. The apparatus may include a beam splitter comprising a beam splitter input, a beam splitter first output, and a beam splitter second output, wherein the beam splitter input is configured to receive a laser pulse, wherein the beam splitter first output provides a reference signal and the beam splitter second output provides a signal of interest; a frequency shifter comprising a shifter input and a shifter output, wherein the shifter input is coupled to the beam splitter first output, wherein the frequency shifter shifts the reference signal to a portion of an optical spectrum separate from another portion of the optical spectrum being used by the signal of interest, wherein the shifter output comprises a shifted reference signal; and a polarization rotator comprising a first rotator input, a second rotator input, and a rotator output, wherein the first rotator input receives the shifted reference signal, wherein the second rotator input receives a signal of interest, and wherein the rotator output comprises the reference signal shifted and rotated by the polarization rotator.

In some variations, one or more of the features disclosed herein including the following features can optionally be included in any feasible combination. The polarization rotator may include a polarization rotator combiner. The rotator output may further include the signal of interest The apparatus may further include a modulator configured to modulate the signal of interest with coherent state information from which quantum key information is derivable. The modulator may include an in-phase and quadrature components modulator and/or an intensity and phase modulator. The rotator output may provide an optical signal carrying the reference signal and the signal of interest modulated with the coherent state information. The coherent state information may include a first random number, X, and a second random number, P, wherein first and second random numbers are selected from within a continuous Gaussian distribution having a zero mean and a predefined variance. The apparatus may further include a laser diode coupled to the beam splitter input. The apparatus may further include a pulse modulator coupled to the laser diode and the beam splitter input. The apparatus may further include a first detector configured to measure the signal of interest and a second detector configured to measure the reference signal. The reference signal may include a local oscillator signal. The frequency shifter may include an electro-optic modulator.

In some example embodiments, there is provided an apparatus. The apparatus may include a polarization splitter rotator comprising a rotator input, a first rotator output, and a second rotator output, wherein the rotator input is configured to receive an optical beam including a signal of interest and a reference signal, wherein the polarization splitter rotator rotates the polarization of the signal of interest and/or the reference signal, wherein the first rotator output provides the signal of interest and the second rotator output provides the reference signal; and a frequency shifter comprising a shifter input and a shifter output, wherein the shifter input is coupled to the second rotator output, wherein the frequency shifter shifts the reference signal back in frequency to account for a frequency shift induced by a transmitter, wherein the shifter output comprises the reference signal shifted to remove the transmitter induced frequency shift.

In some variations, one or more of the features disclosed herein including the following features can optionally be included in any feasible combination. The apparatus may further include an optical homodyne detection receiver configured to receive the signal of interest from the first rotator output, wherein the signal of interest carries coherent state information, wherein the optical homodyne detection receiver measures the X or P quadratures to provide quantum key information. The optical homodyne detection receiver may include a 90-degree optical hybrid coupled to at least one balance detector and at least one variable attenuator. The optical homodyne detection receiver may include a tunable beam splitter coupled to at least one balance detector and at least one variable attenuator. The frequency shifter may include an electro-optic modulator.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Figure 1:
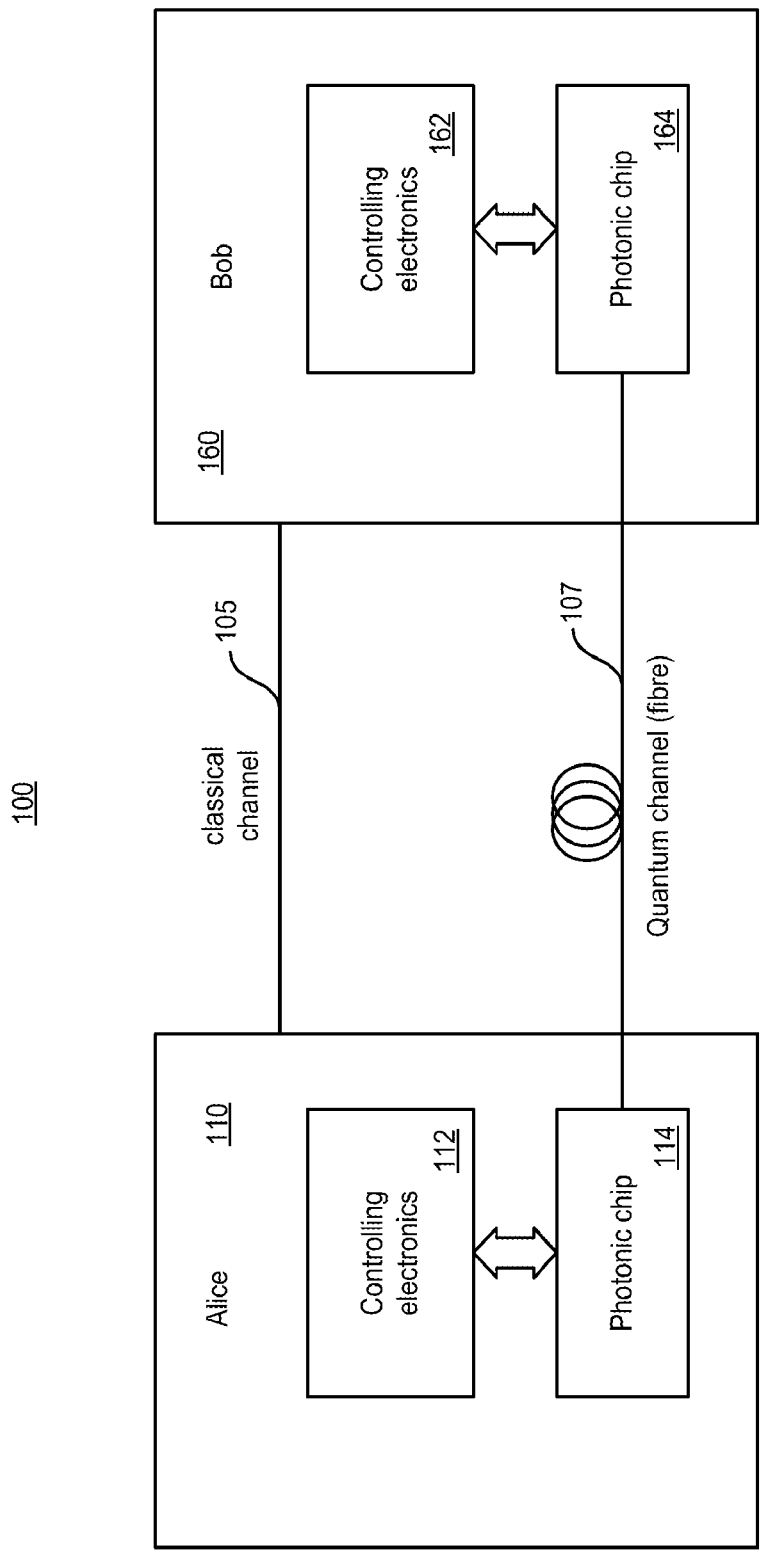
FIG. 1 depicts an example of a system for continuous variable quantum key distribution, in accordance with some example embodiments.

Like labels are used to refer to the same or similar items in the drawings.

DETAILED DESCRIPTION

Continuous variable quantum key distribution (CV-QKD) technology may be used to distribute keys optically, such as over fiber or free space. However, some implementations of CV-QKD rely on discrete optical components, rather than integrated photonic circuits. When compared to integrated photonic circuits, discrete optical components implementations of CV-QKD may be sensitive to temperature variations (for example, uneven air flows in the vicinity of the container for the discrete devices), vibration, and background electromagnetic radiation, all of which can negatively contribute to the noise level of the CV-QKD system. Moreover, CV-QKD implementations using integrated photonic circuits may be more practical for mobile and/or hand-held devices, when compared to bulkier, discrete optical components system implementations.

In some example embodiments, the subject matter disclosed herein may relate to integrated photonic chip circuitry for quantum cryptography based on a CV-QKD protocol-based system. In CV-QKD, a quantum signal (the Signal) may be carried by a modulated weak coherent state (or squeezed states) via a weak laser. On the receiver side of CV-QKD, the quantum signal may be detected with optical coherent homodyne detection techniques by mixing the quantum signal and a reference signal, such as a local oscillator (LO). This creates correlated random data from which raw keying material/information may be derived.

In homodyne detection (which can be employed in CV-QKD), good interference between two optical signals, such as the Signal and the LO, may be needed. Stabilizing this interference may be problematic when the Signal and LO propagate as two separate optical beams.

In some example embodiments, there may be a continuous variable quantum key distribution (CV-QKD) implementation for a photonic chip enabling the Signal and the LO to be carried by the same optical beam by frequency shifting the LO so that its spectrum does not overlap or interfere with the Signal and by rotating the polarity of the LO so that it is different that the polarity of the Signal.

For example, the LO may be shifted in frequency and then rotated in polarization by 90 degrees to provide separation from the Signal. As such, the LO and Signal may be carried by a single optical beam via for example free space or fiber. At the receiver, the LO can be separated from the incoming optical signal and then rotated and shifted back to provide the original LO. With a single beam carrier, interference may be intrinsically robust, which may lead to better signal detection. Moreover, atmospheric phase fluctuations (which may take place during free space propagation) may be self-compensating, when the Signal and LO propagate over a single optical beam.

Before providing additional details regarding the polarization rotation and frequency shifting disclosed herein, the following illustrates an example CV-QKD protocol that can be implemented in the integrated photonic chip circuitry, in accordance with some example embodiments.

In CV-QKD, key information may be carried with quantum state that can only be described with continuous variables. An example implementation of a CV-QKD protocol is the Gaussian Modulated Coherent State (GMCS) protocol.

In GMCS protocol, Alice (which refers to a sending user equipment) may generate two random numbers of X and P within a continuous Gaussian distribution having a zero mean and a predefined variance, $V_A$. A coherent laser pulse, such as a weak coherent laser pulse, may be generated with modulators, and may be encoded with a state, $|X+iP>$. The weak coherent laser pulse encoded with the state is the signal of interest (also referred to herein as the Signal). Alice sends via laser pulse this state to Bob (which refers to a receiving user equipment) along with a strong reference signal, such as a local oscillator (LO). On the receiver side, Bob may measure either the X or P quadrature of the weak coherent state randomly with for example optical homodyne detection, although the X and P quadratures may be measured at the same time as well. This creates correlated random data, from which raw keying material/information may be derived.

Next, Bob informs Alice about the quadrature Bob picked for the measurement. This is referred to as a reverse reconciliation protocol, which may be more efficient than direct reconciliation at low channel transmission efficiency. Direct reconciliation refers to the case when Alice informs Bob about the quadrature. Alice and Bob now each have (or share) a set of correlated Gaussian variables, which form the key information. Subsequent communication between Alice and Bob over an authenticated open channel may be required to evaluate channel parameters, such as the noise level of the communication, and to further derive secure key based on the those channel parameters.

In some example embodiments, integrated photonic chip CV-QKD circuitry may include an optical emitter (for example, for Alice) and/or an optical receiver (for example, for Bob).

FIG. 1 depicts an example of a system 100, in accordance with some example embodiments. The system 100 may include a first user equipment 110 (labeled Alice), which may further include controlling electronics 112 to control and/or drive photonic chip circuitry 114 for transmitting via free space or optical fiber 107. System 100 may further include a second user equipment 160 (labeled Bob). Second user equipment 160 may include controlling electronics 162 to control/drive a photonic chip 164 for receiving via optical fiber 107. The channel 105 (labeled classic channel) may be required for QKD systems in order to provide for key reconciliation (for example, Bob may use this channel to inform Alice regarding the quadrature he measured, the noise level, and/or the like) and/or for error correction (for example, Alice may also exchange error correction information over channel 105).

Although Alice/user equipment 110 is described in some of the examples described herein as a transmitter/emitter, Alice/user equipment 110 may also include a receiver as well. Moreover, although Bob/user equipment 160 is described in some of the examples described herein as a receiver, Bob/user equipment 160 may also include a transmitter/emitter as well.

User equipment 110 and 160 may be mobile and/or portable, although stationary implementations may be used as well. The photonic chips 114 and 164 may process optical signals in accordance with the CV-QKD protocol, in accordance with some example embodiments. Additional driving and/or controlling circuitry may be provided by controlling circuitry 112 and/or controlling circuitry 162. Portions of controlling circuitry 112 may be implemented on the same or different chip as photonic chip 114, and portions of controlling circuitry 162 may be implemented on the same or different chip as photonic chip 164. Each of user equipment 110 and 160 may include (or be coupled to) a random number generator, such as a quantum random number generator. Each of user equipment 110 and 160 may include (or be coupled to) a central processing unit (CPU), The CPU may provide control of user equipment 110/160 and enable execution of the CV-QKD protocol with parameter analysis and key generation.

In some example embodiments, an integrated photonic chip may, as noted, be provided that includes polarization and frequency shifting (for example, multiplexing) to implement CV-QKD protocols. When this combined polarization and frequency shifting/multiplexing is used, the extinction ratio between LO and Signal may still be very high, and photon leaks from LO to Signal may be reduced to a very low level in some implementations.

In some example embodiments, the Signal and LO may, as noted, be separated and thus carried by a common, single optical beam using a combination of polarization and frequency division multiplexing (for example, frequency shifting).

In some example embodiments, the emitter and receiver each include a frequency shifter. On the emitter side (for example, the transmitter), the frequency shifter may, in some example embodiments, shift the optical frequency of LO by a fixed amount Δf (for example, 100 MHz, although other shifts values may be implemented as well). The value of the shift may depend on the frequency shifter's voltage modulator ramping rate. The frequency shift may be selected so that is sufficient to separate the spectrum of the LO from the spectrum of the Signal. Moreover, a polarization rotator combiner (PRC) may be used to separate the LO and Signal polarizations, in accordance with some example embodiments. For example, the PRC may rotate a polarization of the LO so that the LO and Signal have orthogonal polarization, and the PRC may then combine the LO and Signal. Thus, a single, optical beam may carry the LO and Signal at different frequency bands and at different polarizations.

On the receiver side, the received optical signal, or pulse, may be separated according to polarization, in accordance with some example embodiments. For example, a polarization splitter rotator (PSR, for example, a polarization beam splitter coupled to a polarization rotator) may separate the LO and the Signal The LO pulse may then be frequency shifted back by a fixed amount Δf (for example, 100 MHz although other shifts values may be implemented as well) to shift the LO back to its original optical center frequency, which may be the same or similar as that of the Signal pulse. Any photon leaked from the LO to the Signal during the polarization combining and splitting process may have non-overlapping spectrum, so it may not interfere with Signal (and thus not contribute to noise in the homodyne detection). The leakage may be caused by the finite extinction ratio of optical elements, which is in the range from 20 to 40 dB. For examples, it is an indicator of the cross-talk level of two polarizations in polarizing beam splitter or optical fiber. Separating the LO and the Signal by polarization rotation and frequency shifting may reduce unwanted leakage.

Figure 2:
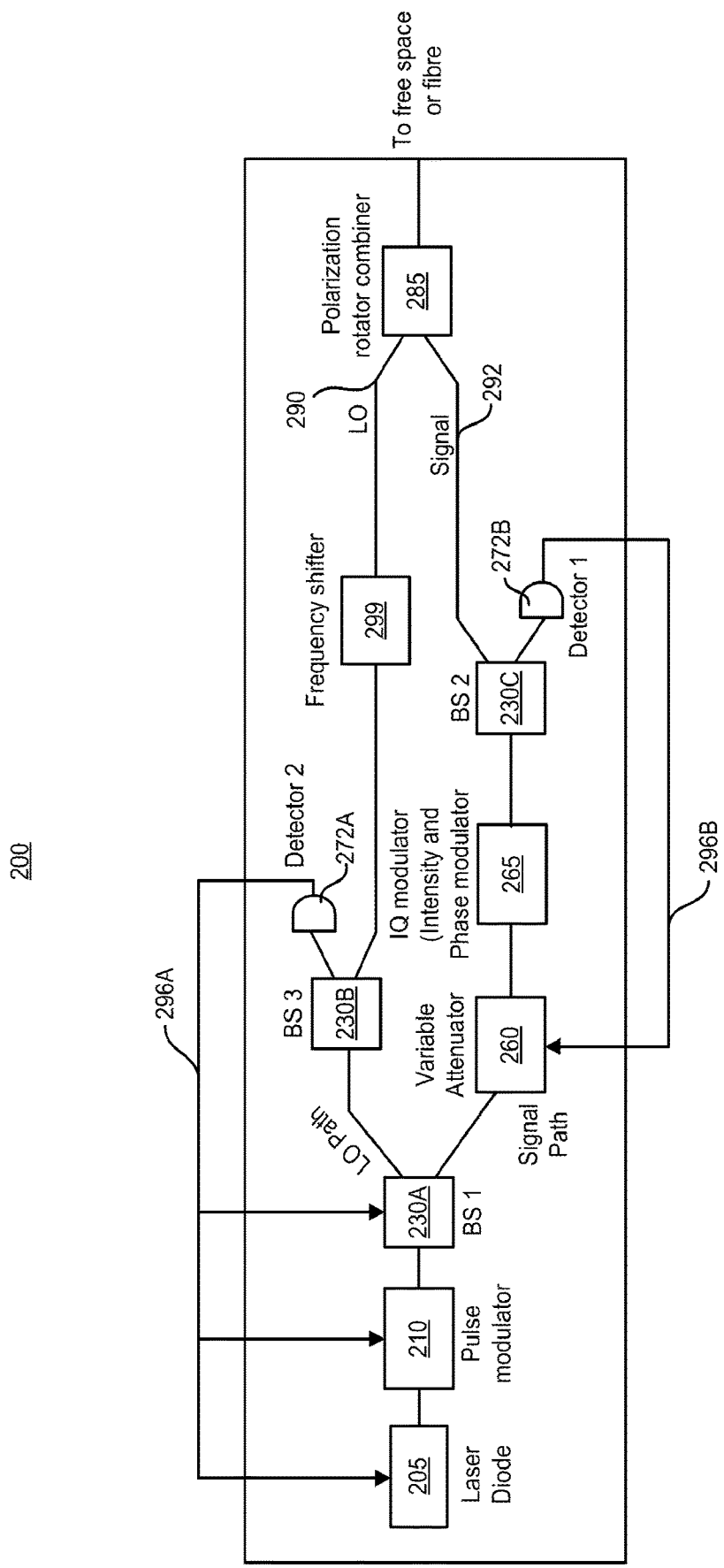
FIG. 2 depicts an example of an emitter photonic integrated circuit for continuous variable quantum key distribution, in accordance with some example embodiments.

FIG. 2 depicts an example of an emitter 200, in accordance with some example embodiments. The emitter 200 may be used as Alice's transmitter at photonic chip circuitry 114, although the emitter may also be included in photonic chip circuitry 164 to enable transmission at user equipment 160 to user equipment 110 as well.

Emitter 200 may include a laser diode 205, a laser pulse modulator 210, one or more beam splitters 230A-C (labeled BS), a variable attenuator 260, an in-phase and quadrature components (I and Q) modulator 265, photodiode detectors 272A and 272B, a frequency shifter 299, and a polarization rotator combiner 285.

The frequency shifting, in accordance with some example embodiments, may be provided in a variety of ways. In some example embodiments, frequency shifter 299 may be implemented as an electro-optic modulator (EOM). For example, an electrical signal, such as a linearly changing voltage, may be applied to the electro-optic modulator, when an optical pulse passes through the electro-optic modulator. This voltage may cause continuous phase shifting in the time domain and, as such, a fixed shift in the frequency domain. Moreover, the voltage ramping rate may determine how much the frequency is shifted. For the fixed frequency change, the voltage must be kept increasing or decreasing linearly for the duration of the optical pulse, as further described below with respect to FIGS. 7-8.

In some example embodiments, the LO 290 may be shifted in frequency, at frequency shifter 299, to provide separation in frequency from the Signal 292.

In some example embodiments, polarization rotator combiner 285 may rotate the polarization of the LO 290 or Signal 292, so that the polarization of the two signals are orthogonal. Moreover, polarization rotator combiner 285 may then combine the LO 290 or Signal 292 to enable those two signals to be carried by the same optical carrier.

Although some of the examples disclosed herein refer to rotating and shifting the LO, the Signal may be rotated and shifted as well. Moreover, the LO may be shifted and the Signal may be rotated, and/or the Signal may be shifted and the LO may be rotated.

Laser diode 205 may generate a laser pulse modulated by pulse modulator 210 to provide a laser pulses with a given strength, pulse length, and repetition rate. In the case of the CV-QKD protocol for example, the pulse strength output by the pulse modulator 210 may be in the range of about $10^7$ to $10^8$ photons/pulse for a pulse width of 0.5 nanoseconds (ns), although other values may be realized as well. Moreover, the optical power for the laser diode 205 may be in the range of about 2.5 to 25 milliwatts (mW) for a 1550 nanometer (nm) laser, although other powers and/or wavelengths may be used as well. In the example of FIG. 2, pulse modulator 210 may operate at a frequency of 1 GHz, although other rates may be used as well. Although the example of FIG. 2 refers to pulse modulator 210, laser diode 205 may also be driven directly in pulse mode. When this is the case, the pulse modulator 210 may be omitted from the emitter 200 of FIG. 2.

Emitter 200 may include a beam splitter 230A to provide optical signal paths, the LO path and the Signal path, where the LO 290 and the Signal 292 can be generated.

As shown at FIG. 2, an output of beam splitter 230A may be coupled to the variable attenuator 260, I and Q modulator 265, and beam splitter 230C, which has a first output coupled to the detector 272B and a second output coupled to polarization rotator combiner 285. I and Q modulator 265 may modulate the Signal pulse with the desired X and P quadratures as noted above. The X and P values may be picked randomly for each pulse from a Gaussian distribution with zero mean and predefined variance, $V_A$. This path represents the Signal path as noted above.

An output of the beam splitter 230A may couple to beam splitter 230B, outputs of which couple to detector 272A and frequency shifter 299. The frequency shifter 299 may be coupled to polarization rotator combiner 285. This path represents the LO path, as noted above.

Polarization rotator combiner (PRC) 285 may combine the Signal 292 and LO 290 into a single optical waveguide for transmission via fiber, free space, and/or the like. As noted, polarization rotator combiner 285 may rotate the polarization of one of the inputs (for example, either Signal 292 or LO 290) by 90 degrees and then combine the two inputs (for example, Signal 292 and LO 290) together into a single output. Although some of the examples described herein refer to a PRC that performs rotating and combining, a rotator separate from the combiner may be implemented as well.

Beam splitters 230A-C may be fixed or tunable beam splitters. The beam splitters may be implemented as fixed directional couplers to split a portion of the laser light (for example, 10% although other values may be implemented as well). The detector 272A (which is coupled to the output of beam splitter 230B) and detector 272B (which is coupled to the output of beam splitter 230C) may be used to monitor the power of the LO (by detector 272A) and the Signal (by detector 272B). The monitored power may be provided as feedback, at 296A or 296B, to control the power of the laser diode 210, pulse modulator 210, and/or beam splitter 230A.

Figure 3:
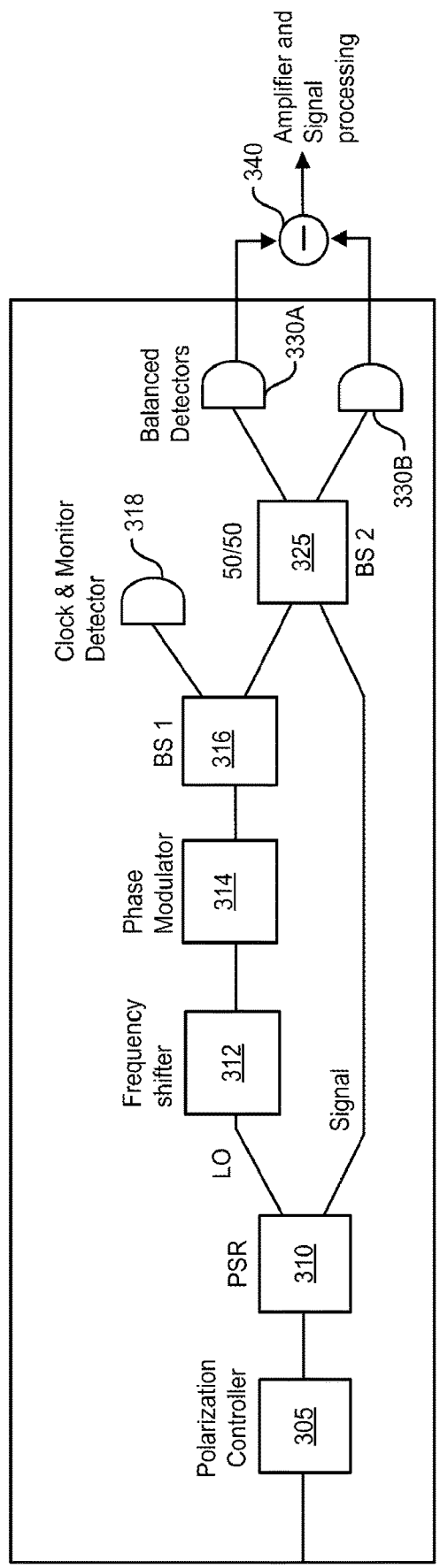
FIG. 3 depicts an example of a receiver photonic integrated circuit for continuous variable quantum key distribution, in accordance with some example embodiments.

FIG. 3 depicts an example of a receiver 300, in accordance with some example embodiments. The receiver 300 may be used as a receiver at photonic chip circuitry 164, although the receiver may also be included in photonic chip circuitry 114 to enable reception at user equipment 110 as well. Receiver 300 chip may be used in connection with CV-QKD protocol in accordance with some example embodiments.

Receiver 300 may include a polarization controller 305. Polarization controller 305 may correct polarization drift caused by the optical channel, such as a free space or optical fiber.

In some example embodiments, receiver 300 may include a polarization splitter rotator 310 (PSR), which is configured to separate the LO and the Signal according to their polarization. For example, PSR 310 may include a splitter providing two optical signals, and may further include an optical rotator to rotate the signals so they are no longer orthogonal (for example to remove the rotation induced at the emitter 200).

On the LO path, the receiver may further include a frequency shifter 312 to remove the frequency shift induced at the emitter 200. For example, the frequency shift may shift the LO signal by the frequency offset provided by frequency shifter 299. The phase modulator 314 may be used to apply (randomly) phase values of either 0 or 90 degrees to measure corresponding X or P quadrature of the Signal. The beam splitter 316 (BS 1) may split a portion of the phase modulator output, so that a portion can be provided as an input to detector 318 and another portion is provided as input to beam splitter 325. Detector 318 may be used to measure sync signals over LO generated and sent by Alice. The sync signal may be used to indicate start and stop of the quantum communication session between Alice and Bob. Detector 318 may also monitor any suspicious signals and/or changes in LO to detect possible eavesdropping.

On the Signal path, beam splitter 325 and detectors 330A-B may provide homodyne detection. For example, the beam splitter 325 may be used to mix the LO and the Signal, and the outputs of the beam splitter 325 may be coupled to photodiode detectors 330A-B (labeled balanced detectors. The difference of the balanced detectors may be taken and then fed into an amplifier system 340 for further processing.

Figure 4:
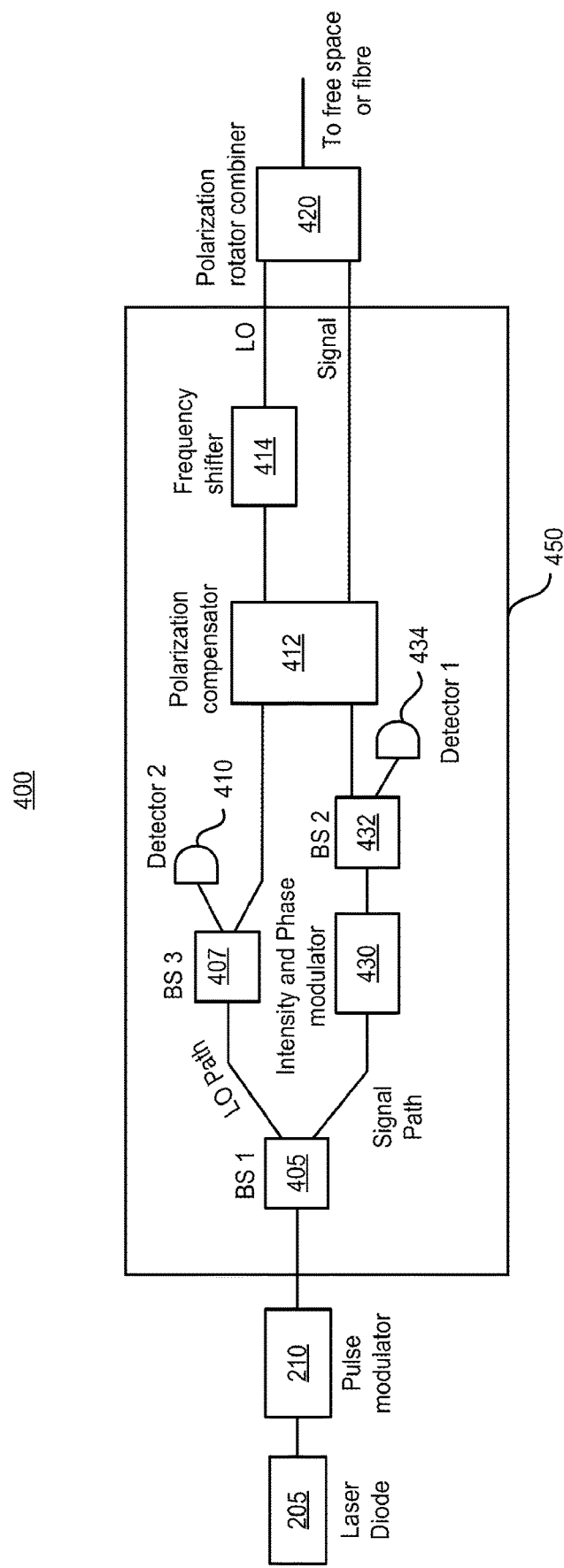
FIG. 4 depicts another example of an emitter photonic integrated circuit for continuous variable quantum key distribution, in accordance with some example embodiments.

FIG. 4 depicts another example of an emitter 400, in accordance with some example embodiments. The emitter 400 may be similar to emitter 200 in some respects but may include additional features as described below.

Emitter 400 may include a beam splitter 405 coupled to the output of pulse modulator 210. The beam splitter 405 may provide optical signals for processing by the LO path and the Signal path.

The LO path may include beam splitter 407 that provides a first output coupled to a detector 410 for monitoring the power of the LO. The monitored power may be fed back to the laser diode, pulse modulator, and/or the beam splitter 407. The beam splitter 407 may also include a second output coupled to polarization compensator 412, in accordance with some example embodiments. In the example of FIG. 4, the polarization compensator 412 comprises a dual-rail polarizer that can provide a priori compensation for any polarization changes anticipated to be encountered during transmission via the optical channel, such as free space or optical fiber.

The output of the polarization compensator 412 may serve as an input to frequency shifter 414, the output of which may serve as an input to polarization rotator combiner 420. As noted, the frequency shifter 414 may shift the LO signal so that it does not overlap in frequency with the Signal. The shifted LO may then be rotated in polarization to make the LO and Signal orthogonal in polarization.

The Signal path may include an I and Q modulator, such as an intensity and phase modulator 430, which may receive the output of beam splitter 405. In the example of FIG. 4, intensity and phase modulator 430 may generate the Signal. For example, the X and P values may be converted to intensity and phase information according to the CV-QKD protocol, in accordance with some example embodiments. Intensity phase modulator 430 may include an amplitude modulator and a phase modulator to provide the intensity and phase modulation for phase.

The intensity and phase modulator 430 may provide its output to beam splitter 432. An output of beam splitter 432 may be detected by detector 434, which can be used to monitor power and provide feedback to the laser diode, pulse modulator, and/or other components. Another output of beam splitter 432 may be provided as an input to a polarization compensator 412, which in this example is the dual-rail polarization compensator. The polarization compensator's signal output may then be coupled to polarization rotator combiner 420, which rotates the polarization of the LO and/or Signal providing for example a 90 degrees polarization difference between the LO and Signal. The polarization rotator combiner 420 may then combine the LO and Signal for transmission via fiber or free space.

Dual-rail polarization compensator 412 may be employed to pre-compensate polarization changes over the transmission path. An example of a polarization compensator 412 is a Mach-Zehnder Interferometer polarization compensator.

Moreover, FIG. 4 shows that one or more components may be located off chip 450 to reduce heat, enable use of other technologies, and/or the like.

Figure 5:
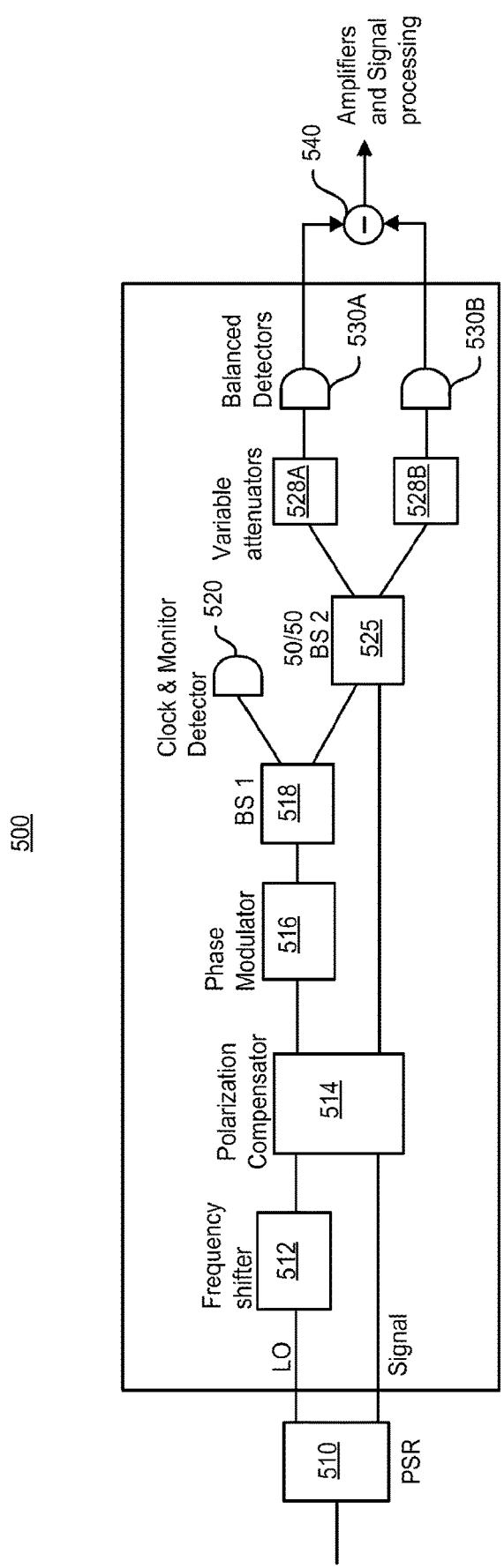
FIGS. 5 and 6 depict additional examples of receivers, in accordance with some example embodiments.

FIG. 5 depicts another example of a receiver 500, in accordance with some example embodiments. The receiver 500 may be similar to receiver 300 in some respects but may include additional features as described below.

The PSR 510 may split the received input signal into two optical signals, one for the LO path and another for the Signal path. The PSR 510 may provide polarization rotation to for example remove the polarization rotation induced by the emitter.

On the LO path, the PSR's output may be provided to frequency shifter 512, which may shift the LO back in frequency by the amount induced at the emitter. In some example embodiments, the frequency shifter's output may be provided to polarization compensator 514, which may compensate for polarization changes induced by the optical channel during transmission. The polarization compensator's output may be further coupled to a phase modulator 516, the output of which is provided to beam splitter 518. A portion of the beam splitter 518 output may be provided to clock and monitor detector 520 to monitor the power of the LO.

On the Signal path, the PSR's output may be provided to polarization compensator 514 as well. In the example, polarization compensator 514 is a dual-rail polarization compensating configured to compensate for any polarization caused by the optical channel itself.

A portion of the beam splitter 518 output may be provided to beam splitter 525, which is coupled to variable attenuators 528A-B and detectors 530A-B. Beam splitter 525 may provide a mixer, while the variable attenuators 528A-B and detectors 530A-B provide a homodyne detector. The variable attenuators 528A-B enable adjustment to take into account any fabrication imperfections of beam splitters or other components along the LO or Signal paths. The difference of the balanced detectors 530A-B may be taken and then fed into an amplifier system 540 for further processing.

Figure 6:
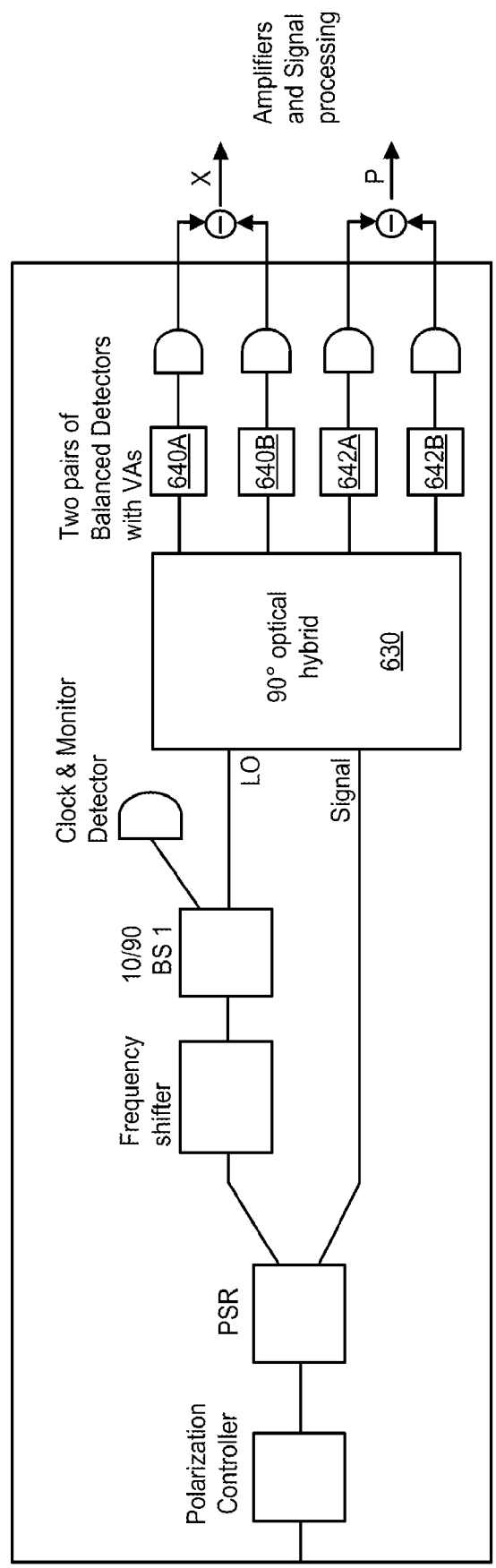

FIG. 6 depicts another example of a receiver 600, in accordance with some example embodiments. Receiver 600 may be similar to receiver 500 in some respects but may include additional features.

Receiver 600 may include a 90-degree optical hybrid 630 and two pairs of balanced detectors 640A-B and 642A-B, in accordance with some example embodiments. The 90-degree optical hybrid 630 may be implemented on-chip as a 4×4 multimode interference (MMI) coupler. Each pair of balanced detectors may be similar to the balanced detectors described above with respect to FIG. 5. In the example of FIG. 6, there may be no need for a phase modulator on the LO path as the two pairs of balanced detectors (after 90-degree optical hybrid) may measure X and P quadratures simultaneously. With both X and P measured, the parameter assessment and key distillation algorithm in the CV-QKD protocol may be modified accordingly. Four variable attenuators may be employed to compensate the imperfection of the splitting ratios of the 4×4 MMI coupler. The four variable attenuators may also compensate for any unwanted light leakage from the LO to Signal.

Figure 7:
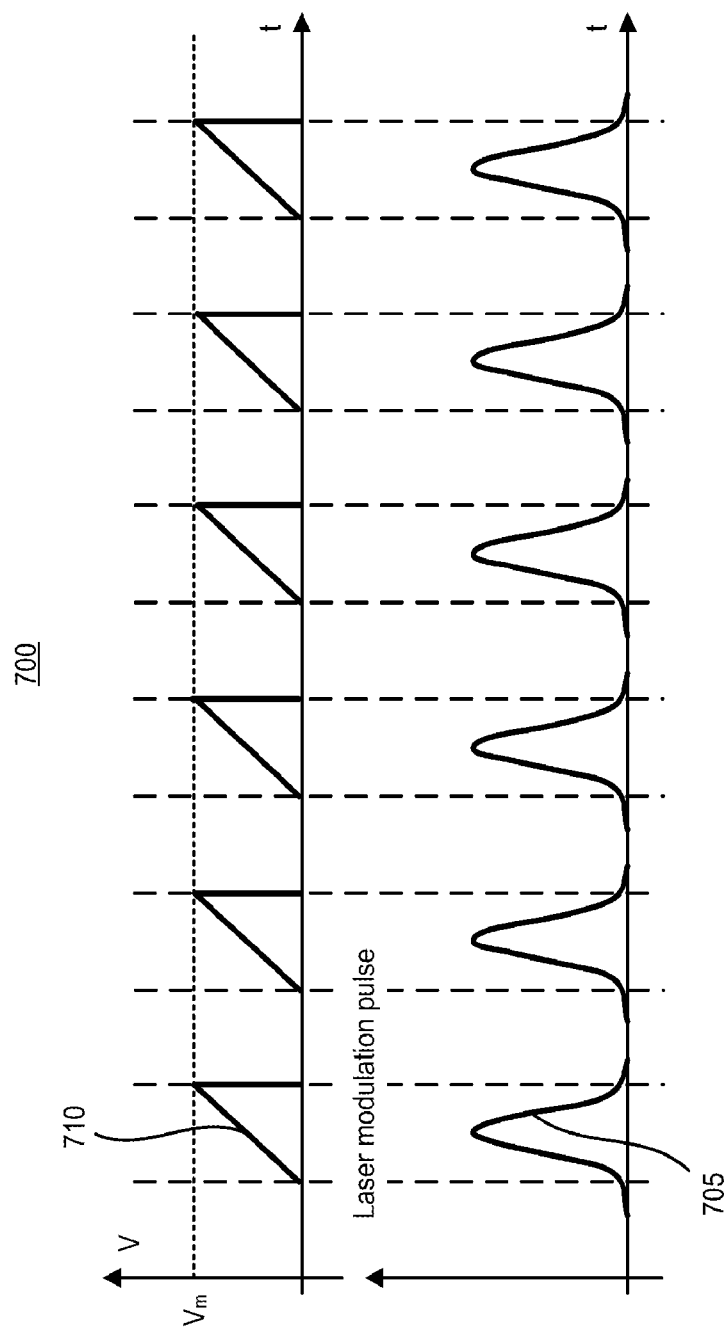
FIG. 7 depicts an example of a plot of a driving signal for the frequency shifter at the emitter, in accordance with some example embodiments.

FIG. 7 shows an example of a driving signal applied to an EOM providing an optical frequency shifter at for example 299 (FIG. 2), in accordance with some example embodiments. The linear ramping up voltage 710 may be applied to the EOM providing the frequency shifter disclosed herein. For a given optical pulse 705, the linear ramping signal 710 may be constantly increasing in order to provide a fixed frequency shift. For a fixed frequency shift of $\Delta f=100$ MHz for example and $V_\pi=3$ V, the voltage ramping rate can be calculated as $V_r=2*\Delta f*V_\pi=6\times10^8$ V/s. For a 10 ns long pulse, the maximum voltage $V_m$ required may be about 6 volts (V).

Figure 8:
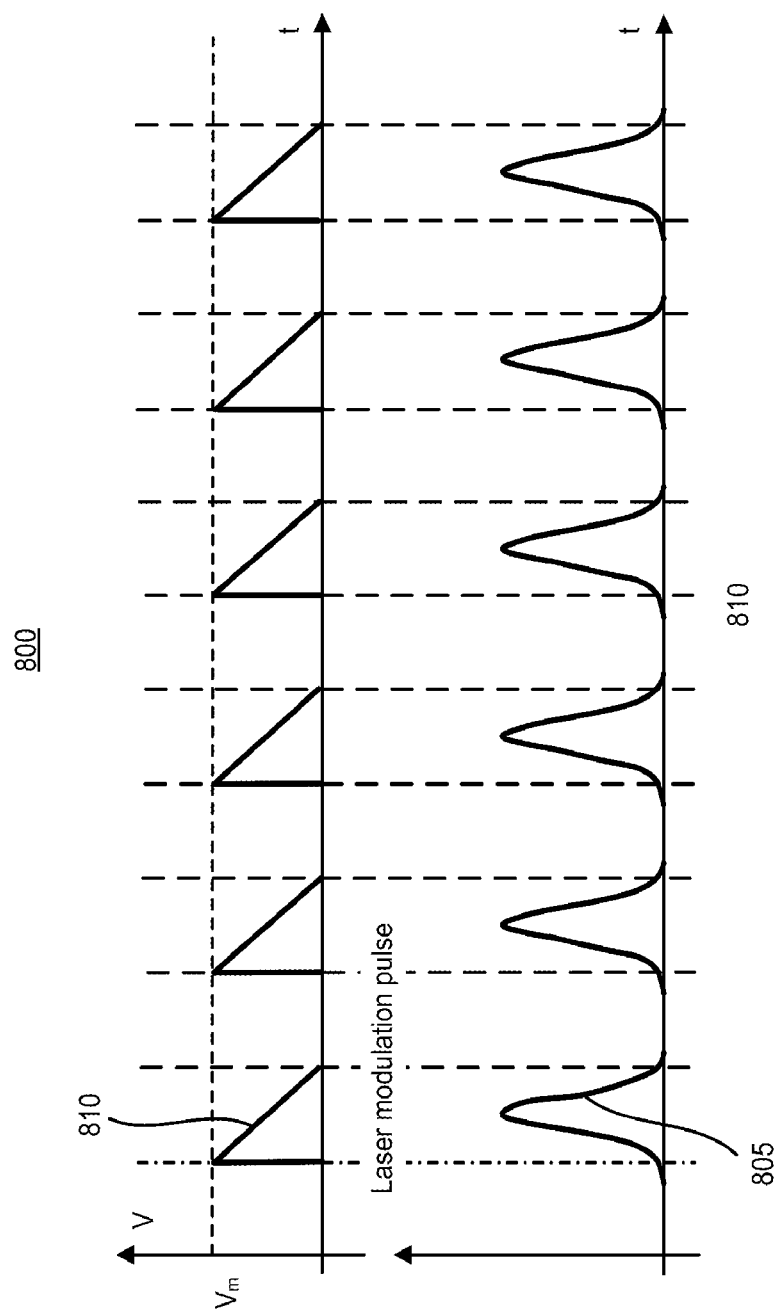
FIG. 8 depicts an example of a plot of a driving signal for the frequency shifter at the receiver, in accordance with some example embodiments.

In some example embodiments, the spectrum width of the laser diode may be much smaller than the desired, frequency shift provided by the frequency shifter. Moreover, at the emitter, a continuous wave (CW) laser signal from a laser diode 205 for example, may be modulated into pulses, such as 705, by pulse modulator 210. The shape of the driving voltage pulse for this pulse modulator, and the shape of the resulting laser pulse may be configured based on its voltage and optical intensity relationship. Examples of Gaussian shaped optical pulses 705 in time domain are shown in the lower portion of FIG. 7 as well as at 805 at FIG. 8. FIG. 8 depicts the driving signal 810 for the receiver side.

Gaussian pulses in time domain may also have Gaussian-shaped spectra in the frequency domain and, as such, photon leaks can be readily determined. For a given $N_{leak}$ (indication of 1 photons leaked from LO to Signal) requirement for example, two parameters may need to be considered simultaneously when using frequency shifting with a fixed-voltage ramping rate, a voltage required for phase modulation and a temporal and spectral width of the pulse.

Figure 9:
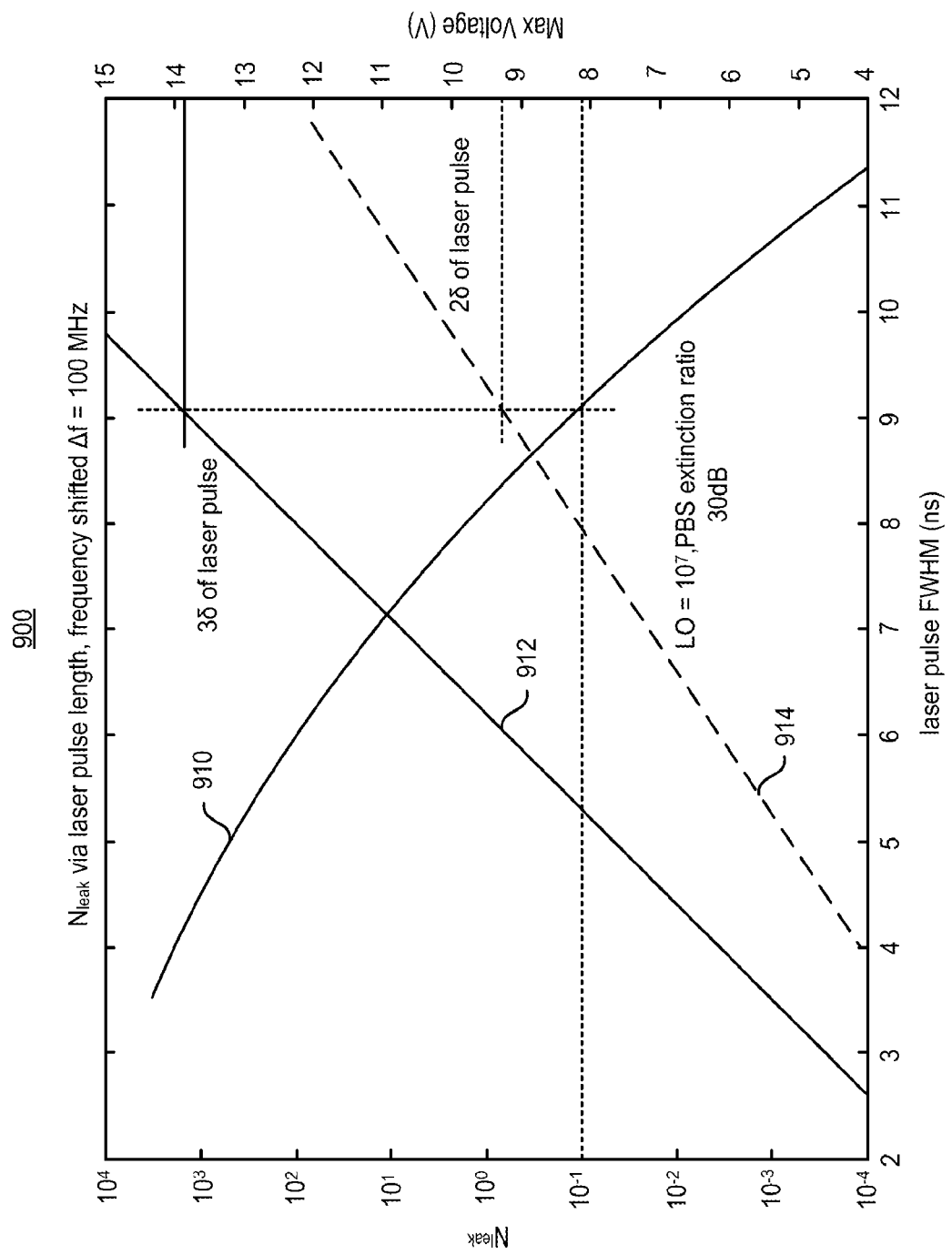
FIG. 9 depicts a plot of photon leakage and maximum voltage needed as a function of laser pulse width, in accordance with some example embodiments.

FIG. 9 shows a maximum voltage, $V_m$, required as a function of laser pulse width 912 and 914. Line 910 shows photon leaks, $N_{leak}$, from LO to Signal due to spectral overlap. For target $N_{leak}$ of about 0.1, a $V_m$ of about 14 volts (V) may be required to cover the 3σ (23 nanosecond (ns) modulation time) range of the laser pulses length (9 ns at full width half maximum), this may cover 99.7% of the laser pulse intensity. This voltage range can be distributed between −7 to 7 volts.

The pulse width requirement for a pure square-shaped laser pulse in time domain may also be determined, and the result may be that a temporal width of 18 ns is needed for the intended $N_{leak}$ of about 0.1. The maximum voltage $V_m$ may be specified to be 11 V in this case. Optimization for a more suitable pulse shape in time domain with smallest frequency shifting voltage may still be realized.

The voltage ramping rate of the frequency shifter at the receiver chip may need to work in reverse to the one at the emitter side, as shown in FIG. 8. The frequency may need to be shifted back by the same amount, to recover its original value before its modulation on the emitter chip. This shift $\Delta f$ may need to be pre-agreed between the two communicating parties. The timing jitters for both the emitter and receiver chips may be much less than the time required for the voltage modulation (which should be greater than the temporal width of the laser pulse), say 1-2 ns for example. This requirement may be less stringent if the ramping time for the phase modulation is made shorter by increasing $V_m$.

Since the laser pulse width may be about 15-25 ns in some implementations, according to the above calculation, the clock rate of the CV-QKD system may be run at a range of 10-20 MHz in this example to leave enough clean space between adjacent laser pulses. Further reductions in $V_m$ (or increase shifted frequency range $\Delta f$) and increases in the system clock rate may be achieved by: further optimization with optimized laser pulse shape; a modulator geometry having an increased modulation length on chip; and/or more efficient error-correction at lower signal to noise ratios in CV-QKD systems. In contrast to 0.1 (which was used in the above example calculation), the required $N_{leak}$ may be potentially in the range of 1-100 (with signal to noise ratio in the range of about 10-0.1).

Figure 10:
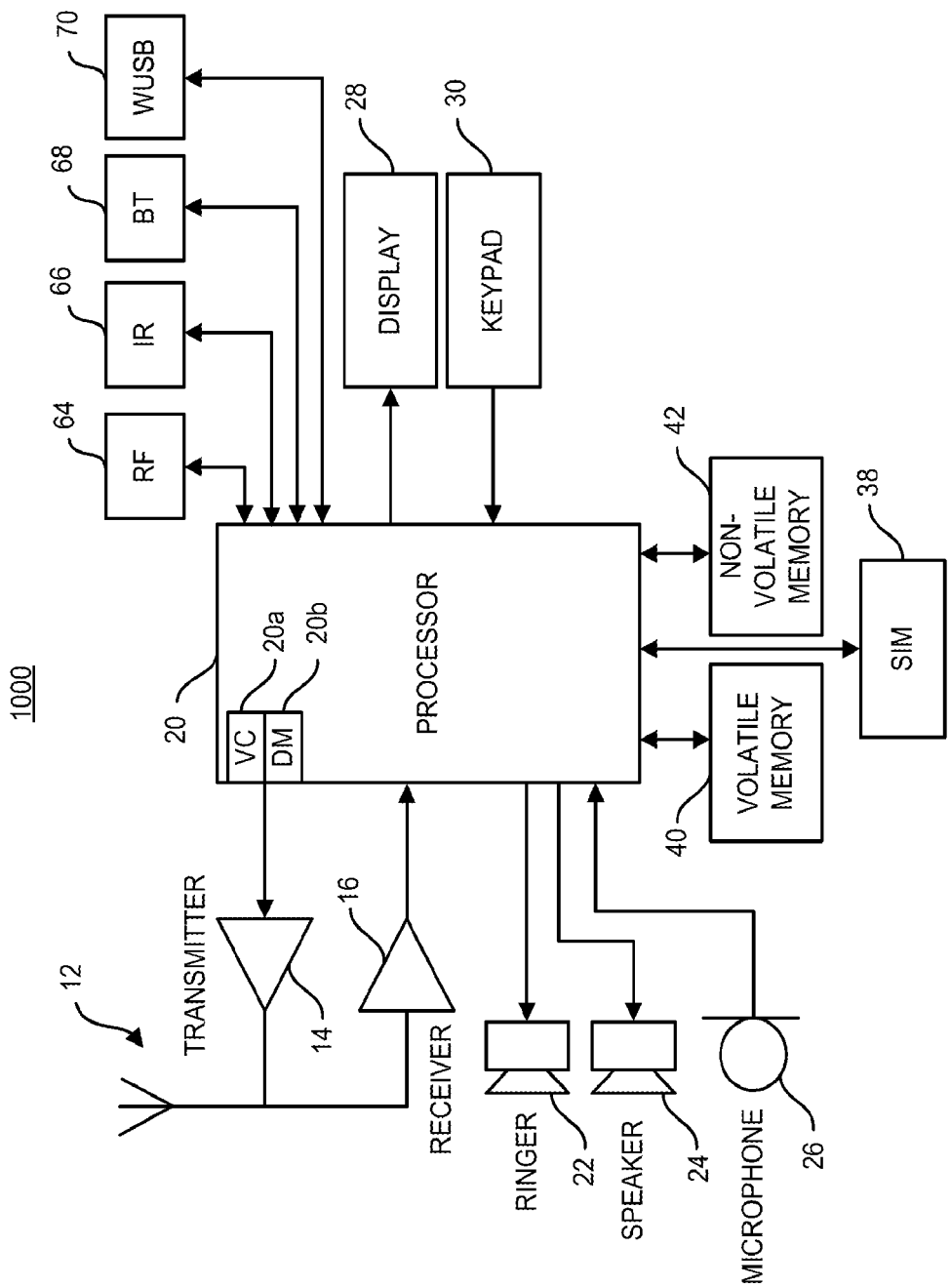
FIG. 10 depicts an example of an apparatus, in accordance with some example embodiments.

FIG. 10 depicts an example of an apparatus 1000, in accordance with some example embodiments. The apparatus 1000 may comprise a user equipment, such as a smart phone, a cell phone, a wearable radio device, and/or any other radio based device including for example a wireless access point/base station.

In some example embodiments, apparatus 1000 may also include a radio communication link to a cellular network, or other wireless network. The apparatus 1000 may include at least one antenna 12 in communication with a transmitter 14 and a receiver 16. Alternatively transmit and receive antennas may be separate.

In some example embodiments, the transmitter 14 may include the integrated photonic chip circuitry for providing CV-QKD protocol-based transmission as disclosed herein. For example, photonic chip 114, emitter 200, and/or emitter 400 may be included in transmitter 14.

In some example embodiments, the receiver 16 may include the integrated photonic chip circuitry for providing CV-QKD protocol-based reception as disclosed herein. For example, photonic chip 164, receiver 300, receiver 500, and/or receiver 600 may be included in receiver 16.

The apparatus 1000 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 1000 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 1000 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 1000 may be capable of operating with one or more air interface standards, communication protocols, modulation types, access types, and/or the like. For example, the apparatus 1000 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 1000 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 1000 may be capable of operating in accordance with 2.5G wireless communication protocols General Packet Radio Service (GPRS), Enhanced Data GSM Environment (EDGE), and/or the like. Further, for example, the apparatus 1000 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 1000 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 1000 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 1000. For example, the processor 20 may comprise a digital signal processor device, a microprocessor device, an analog-to-digital converter, a digital-to-analog converter, and/or the like. Control and signal processing functions of the apparatus 1000 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 1000 to perform actions. For example, processor 20 may be capable of operating a connectivity program, such as, a web browser. The connectivity program may allow the apparatus 1000 to transmit and receive web content, such as location-based content, according to a protocol, such as, wireless application protocol, wireless access point, hypertext transfer protocol, HTTP, and/or the like.

Apparatus 1000 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 1000 may include a battery for powering various circuits related to the mobile terminal, for example, a circuit to provide mechanical vibration as a detectable output. The user input interface may comprise devices allowing the apparatus 1000 to receive data, such as, a keypad 30 (which can be a virtual keyboard presented on display 28 or an externally coupled keyboard) and/or other input devices.

Moreover, the apparatus 1000 may include a short-range radio frequency (RF) transceiver and/or interrogator 64, so data may be shared with and/or obtained from electronic devices in accordance with RF techniques. The apparatus 1000 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, and other radio standards. In this regard, the apparatus 1000 and, in particular, the short-range transceiver may be capable of transmitting data to and/or receiving data from electronic devices within proximity of the apparatus, such as within 10 meters. The apparatus 1000 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 1000 may comprise memory, such as, a subscriber identity module (SIM) 38, a removable user identity module (R-UIM), and/or the like, which may store information elements related to a mobile subscriber. In addition to the SIM, the apparatus 1000 may include other removable and/or fixed memory. The apparatus 1000 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing the CV-QKD-protocol operations described herein. The memories may comprise an identifier, such as an international mobile equipment identification (IMEI) code, capable of uniquely identifying apparatus 1000. The functions may include one or more of the operations disclosed herein with respect to the receiver or emitter. The memories may comprise an identifier, such as an international mobile equipment identification (IMEI) code, capable of uniquely identifying apparatus 1000. In the example embodiment, the processor 20 may be configured using computer code stored at memory 40 and/or 42 to provide the CV-QKD-protocol operations described herein.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause the CV-QKD-protocol operations described herein.

Without in any way limiting the scope, interpretation, or application of the claims appearing below, a technical effect of one or more of the example embodiments disclosed herein is a compact on chip design, smaller foot print, and/or lower noise.

Without in any way limiting the scope, interpretation, or application of the claims appearing below, a technical effect of one or more of the example embodiments disclosed herein is no need for a separate guide laser beam.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. An apparatus comprising:
   a beam splitter comprising a beam splitter input, a beam splitter first output, and a beam splitter second output, wherein the beam splitter input is configured to receive a laser pulse, wherein the beam splitter first output is configured to provide a reference signal and the beam splitter second output is configured to provide a signal of interest;
   a frequency shifter comprising a shifter input and a shifter output, wherein the shifter input is coupled to the beam splitter first output, wherein the frequency shifter is configured to shift the reference signal to a portion of an optical spectrum separate from another portion of the optical spectrum being used by the signal of interest, wherein the shifter output comprises a shifted reference signal; and
   a polarization rotator comprising a first rotator input, a second rotator input, and a rotator output, wherein the first rotator input is configured to receive the shifted reference signal, wherein the second rotator input is configured to receive a signal of interest, and wherein the rotator output comprises the reference signal shifted and rotated by the polarization rotator, and the rotator output is configured to transmit an optical beam including the signal of interest and the reference signal.

2. The apparatus of claim 1, wherein the polarization rotator comprises a polarization rotator combiner, and wherein the rotator output further comprises the signal of interest.

3. The apparatus of claim 1 further comprising:
   a modulator configured to modulate the signal of interest with coherent state information from which quantum key information is derivable.

4. The apparatus of claim 3, wherein the modulator comprises an in-phase and quadrature components modulator and/or an intensity and phase modulator.

5. The apparatus of claim 3, wherein the rotator output is configured to provide an optical signal carrying the reference signal and the signal of interest modulated with the coherent state information.

6. The apparatus of claim 3, wherein the coherent state information comprises a first random number, X, and a second random number, P, wherein first and second random numbers are selected from within a continuous Gaussian distribution having a zero mean and a predefined variance.

7. The apparatus of claim 1 further comprising:
   a laser diode coupled to the beam splitter input.

8. The apparatus of claim 1 further comprising:
   a pulse modulator coupled to the laser diode and the beam splitter input.

9. The apparatus of claim 1 further comprising:
   a first detector configured to measure the reference signal; and
   a second detector configured to measure the signal of interest.

10. The apparatus of claim 1, wherein the reference signal comprises a local oscillator signal.

11. The apparatus of claim 1, wherein the frequency shifter comprises an electro-optic modulator.

12. An apparatus comprising:
    a polarization splitter rotator comprising a rotator input, a first rotator output, and a second rotator output, wherein the rotator input is configured to receive an optical beam including a signal of interest and a reference signal, wherein the polarization splitter rotator is configured to rotate the polarization of the signal of interest and/or the reference signal, wherein the first rotator output is configured to provide the signal of interest and the second rotator output is configured to provide the reference signal; and
    a frequency shifter comprising a shifter input and a shifter output, wherein the shifter input is coupled to the second rotator output, wherein the frequency shifter is configured to shift the reference signal back in frequency to account for a frequency shift induced by a transmitter, wherein the shifter output comprises the reference signal shifted to remove the transmitter induced frequency shift.

13. The apparatus as in any of claim 12 further comprising:
    an optical homodyne detection receiver configured to receive the signal of interest from the first rotator output, wherein the signal of interest carries coherent state information, wherein the optical homodyne detection receiver is configured to measure the X or P quadratures to provide quantum key information.

14. The apparatus of claim 12, wherein the optical homodyne detection receiver comprises a 90-degree optical hybrid coupled to at least one balanced detector and at least one variable attenuator.

15. The apparatus of claim 12, wherein the optical homodyne detection receiver comprises a tunable beam splitter coupled to at least one balanced detector and at least one variable attenuator.

16. The apparatus of claim 12, wherein the frequency shifter comprises an electro-optic modulator.

17. A method comprising:
    receiving, at a beam splitter, a laser pulse, wherein the beam splitter comprises a beam splitter input, a beam splitter first output, and a beam splitter second output, wherein the beam splitter input is configured to receive the laser pulse, wherein the beam splitter first output is configured to provide a reference signal and the beam splitter second output is configured to provide a signal of interest;
    shifting, by a frequency shifter comprising a shifter input and a shifter output, the reference signal to a portion of an optical spectrum separate from another portion of the optical spectrum being used by the signal of interest, wherein the shifter input is coupled to the beam splitter first output, and wherein the shifter output comprises a shifted reference signal; and
    rotating, by a polarization rotator comprising a first rotator input, a second rotator input, and a rotator output, the reference signal, wherein the first rotator input is configured to receive the shifted reference signal, wherein the second rotator input is configured to receive the signal of interest, and wherein the rotator output comprises the reference signal shifted and rotated by the polarization rotator, and the rotator output is configured to transmit an optical beam including the signal of interest and the reference signal.

18. The method of claim 17, wherein the polarization rotator comprises a polarization rotator combiner, and wherein the rotator output further comprises the signal of interest.

19. A method comprising:
    rotating, by a polarization splitter rotator comprising a rotator input, a first rotator output, and a second rotator output, a polarization of a signal of interest and/or a reference signal, wherein the rotator input is configured to receive an optical beam including the signal of interest and the reference signal, wherein the first rotator output is configured to provide the signal of interest and the second rotator output is configured to provide the reference signal; and shifting, by a frequency shifter comprising a shifter input and a shifter output, the reference signal back in frequency to account for a frequency shift induced by a transmitter, wherein the shifter input is coupled to the second rotator output, and wherein the shifter output comprises the reference signal shifted to remove the transmitter induced frequency shift.

20. A non-transitory computer-readable storage medium including computer program code which when executed by at least one processor causes operations comprising:

receiving, at a beam splitter, a laser pulse, wherein the beam splitter comprises a beam splitter input, a beam splitter first output, and a beam splitter second output, wherein the beam splitter input is configured to receive the laser pulse, wherein the beam splitter first output is configured to provide a reference signal and the beam splitter second output is configured to provide a signal of interest;

shifting, by a frequency shifter comprising a shifter input and a shifter output, the reference signal to a portion of an optical spectrum separate from another portion of the optical spectrum being used by the signal of interest, wherein the shifter input is coupled to the beam splitter first output, and wherein the shifter output comprises a shifted reference signal; and rotating, by a polarization rotator comprising a first rotator input, a second rotator input, and a rotator output, the reference signal, wherein the first rotator input is configured to receive the shifted reference signal, wherein the second rotator input is configured to receive the signal of interest, and wherein the rotator output comprises the reference signal shifted and rotated by the polarization rotator, and the rotator output is configured to transmit an optical beam including the signal of interest and the reference signal.

* * * * *